July 15, 1958  D. R. DAYKIN ET AL  2,843,820
VOLTAGE REGULATION APPARATUS
Filed Nov. 22, 1955  3 Sheets-Sheet 1
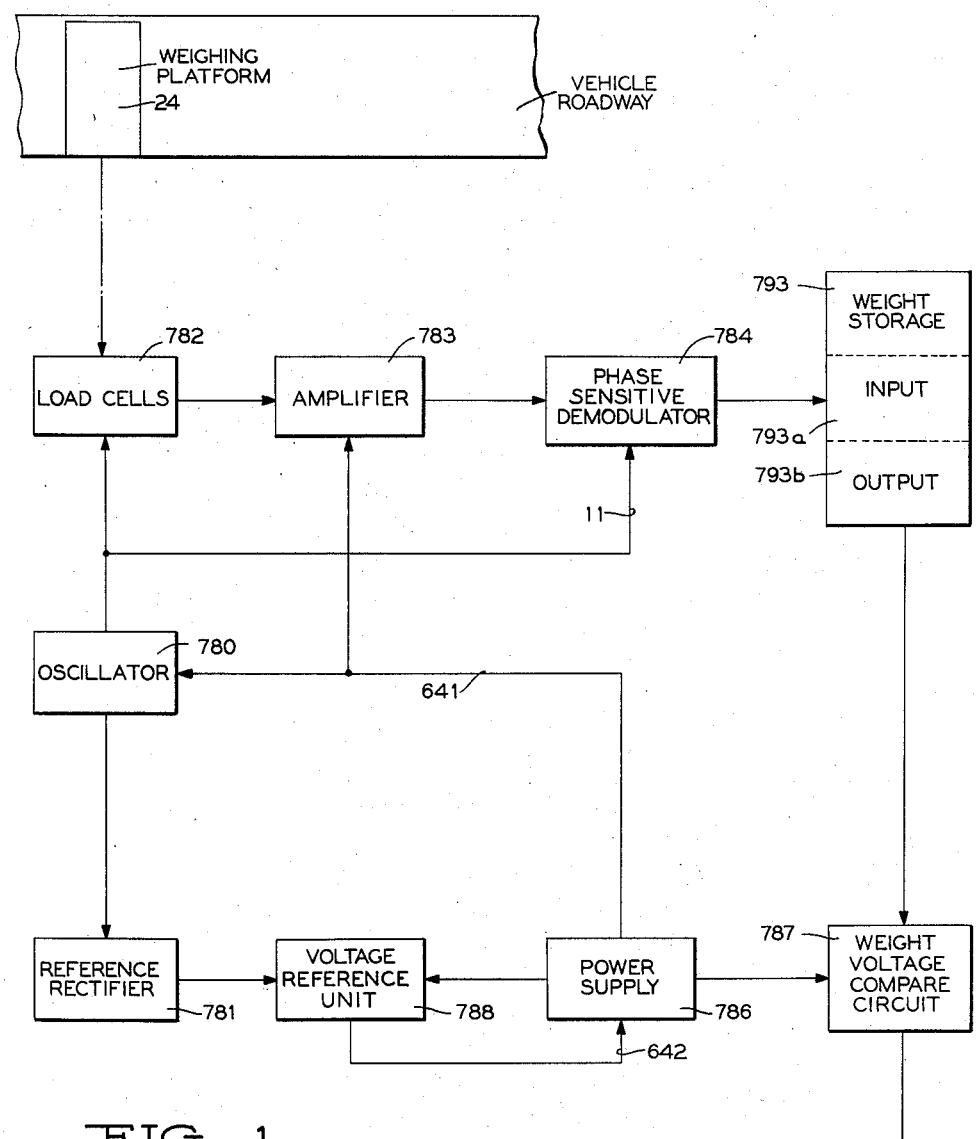
FIG_1_
INVENTORS
DONALD R. DAYKIN
GEORGE R. STILWELL, JR.
BY
J. Jancin Jr.
ATTORNEY

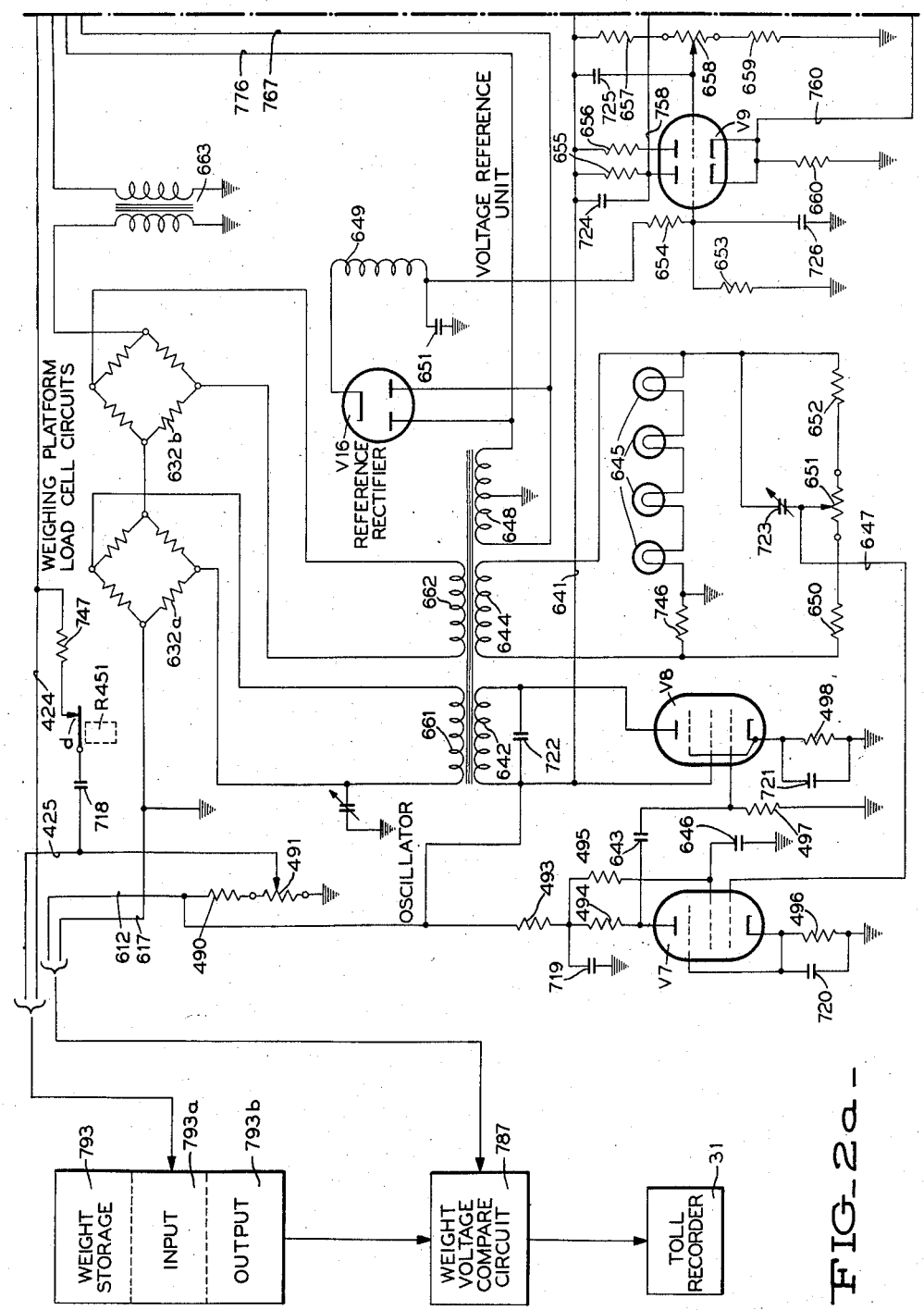

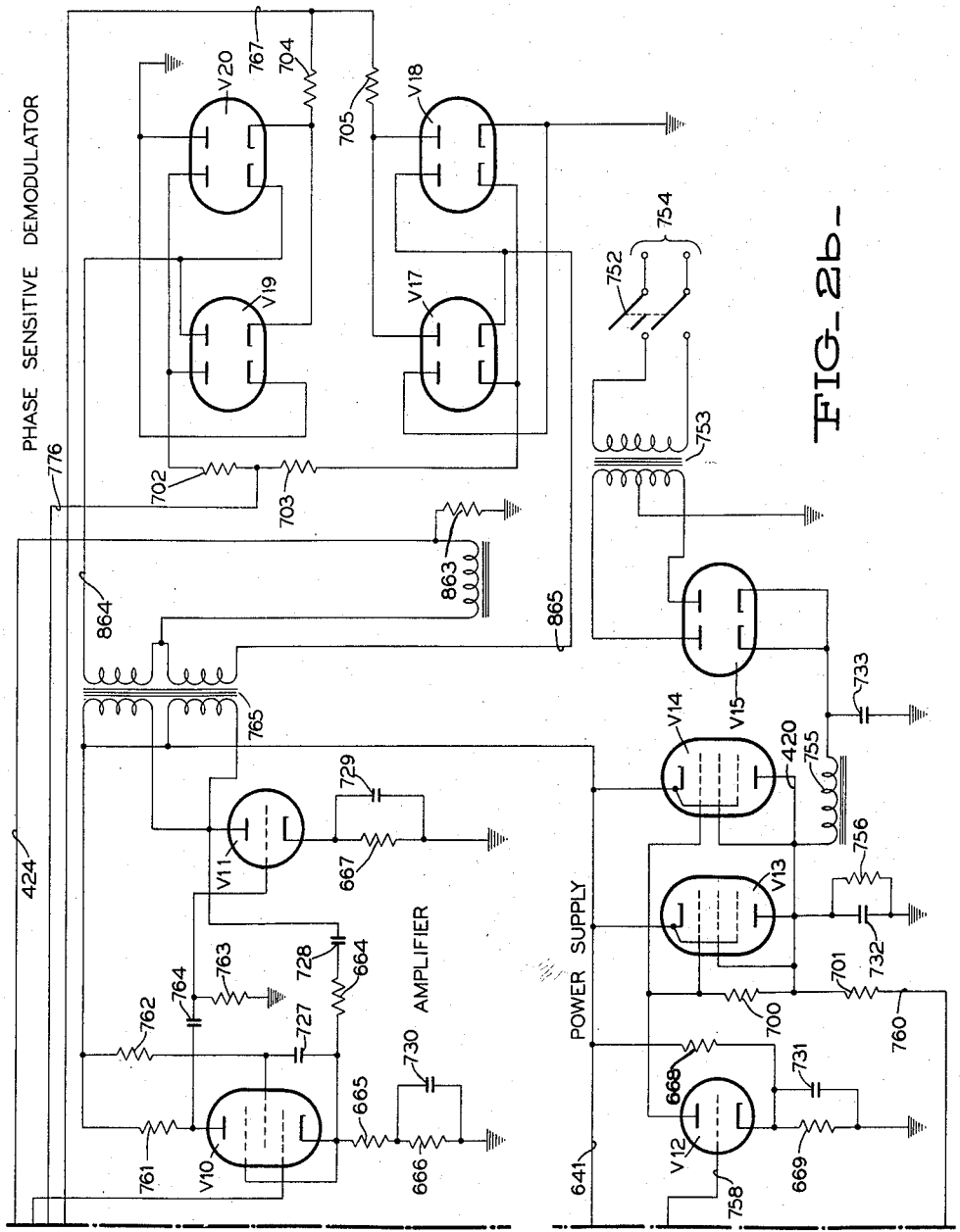

2,843,820

VOLTAGE REGULATION APPARATUS

Donald R. Daykin, Vestal, and George R. Stilwell, Jr., Johnson City, N. Y., assignors to International Business Machines Corporation, New York, N. Y., a corporation of New York Application November 22, 1955, Serial No. 548,356

3 Claims. (Cl. 323—22)

This invention relates to an electronic system for regulating a D. C. voltage which is applied to a load circuit so as to maintain a predetermined relationship between the said D. C. voltage and a variable A. C. reference voltage, and has for its broad object the provision of an improved electronic voltage regulator system.

In copending U. S. patent application Serial No. 443,264, filed on July 14, 1954, by J. M. Cunningham et al., there is shown and described a dynamic weighing toll highway recorder system for determining, among other things, the classification of a vehicle in accordance with the weight thereof. In this system, as each axle of a vehicle is moved over a weighing platform supported by load cells of the general type disclosed in Ruge Patent No. 2,472,047 which issued on May 31, 1949, an axle weight-representing voltage of a magnitude proportional to the axle load aplied to the weighing platform, is directed from the load cells to an axle weight storage condenser. Each axle weight-representing voltage obtained by the dynamic weighing operation is stored in a separate axle weight condenser for subsequent use.

As is known by persons familiar with the toll recorder system art, the classification of a vehicle is required in order to determine, either in whole or in part, the toll to be paid and is often based on the weight of the vehicle. This is believed to be the most equitable way of determining vehicle classification.

In the afore-mentioned copending application described toll highway recorder system, the weight of a vehicle is indicated by a voltage which is obtained by additively combining on an axles-per-vehicle basis the axle weight-representing voltages stored in separate select axle weight condensers corresponding to the axles of the vehicle. This "sum total" vehicle weight-representing voltage is then compared with various so-called voltage standards, one at a time and each of a different magnitude which is greater than the preceding one, in a step-by-step fashion until a predetermined relationship is reached between the vehicle weight-representing voltage and a particular voltage standard. At this time, the step-by-step comparing operation is caused to end, and a classification indicating device in the toll recorder per se is operated so that the classification of the vehicle is recorded on a trip card associated with the vehicle during the cyclic operation of the toll recorder.

Since the excitation voltage for the load cells of the copending Cunningham et al. application embodiment is obtained from an alternating current oscillation generator, it should be apparent that the amplitude of the oscillations generated should be constant under all conditions in order that a given magnitude of load cell output voltage will always represent a given weight value. This is accomplished in the present invention by an improved oscillation generator voltage regulator feed-back circuit. Furthermore, since the vehicle weight-representing voltage is compared during vehicle classification determining time, with various voltage standards, the magnitude of each voltage standard must also be regulated. This is accomplished in the present invention by an improved D. C. power supply voltage regulator for regulating the voltage applied to an electrical load line from which the various voltage standards mentioned previously are obtained via a voltage divider circuit connected to the aforesaid regulated load line. In addition, since the vehicle weight-representing voltage is compared with various voltage standards so as to determine the vehicle classification, the relationship between the oscillation generator output voltage and the regulating power supply voltage should always be kept the same. This is accomplished in the present invention by a so-called voltage reference unit which correlates the oscillation generator and regulated D. C. power supply load voltages by referencing the aforementioned power supply load line voltage to the oscillation generator output voltage. Due to the action of the voltage reference unit, the regulated power supply D. C. load voltage is always at a predetermined value relative the oscillation generator A. C. output. It should be clear that a predetermined ratio therebetween must be maintained at all times for correct toll recorder system operation. If, for example, the amplitude of the oscillation generator output voltage were to decrease for any reason, and if the regulated power supply load voltage did not decrease a corresponding amount, the ratio therebetween would of course be altered and the vehicle classification values determined thereafter would be incorrect and inconsistent with the previously determined classification values, until the oscillation generator voltage returned to its original magnitude or until the power supply D. C. load voltage was decreased a proper amount.

The present invention is particularly adapted for electrical dynamic weighing systems of the general type described in the afore-mentioned copending Cunningham et al. application where the time allotted for taking a weight reading is extremely short. For one thing, changes in the oscillation generator and regulated power supply load voltages, are corrected rapidly and accurately. For another thing, the present invention provides for the two afore-mentioned output voltages to be correlated, and therefore maintained at a select predetermined ratio at all times. These features combine to provide a dynamic weighing system which will operate accurately over a long time period with a minimum of operator attendance.

Another object of this invention is to provide an improved voltage regulator apparatus for a dynamic weighing toll highway recorder system which can operate accurately and therefore efficiently for long periods of time.

Another object of this invention is the provision of a voltage regulator system for delivering a D. C. load circuit voltage which is constant so long as an A. C. reference voltage is constant, but which D. C. voltage varies correspondingly with a variance in the A. C. reference voltage, to thereby maintain a predetermined relationship between the D. C. and the A. C. voltages.

Another object of this invention is to provide an apparatus that may be adjusted manually to establish a desired ratio between the afore-mentioned D. C. and A. C. voltages, and one that will maintain this voltage relationship notwithstanding a variance in the magnitudes of the voltages.

In line with the foregoing, another object of this invention is to provide an improved oscillation generator for producing a constant amplitude output voltage.

Still another object of this invention is to provide an oscillation generator having a voltage regulator in the feed-back circuit of the amplifier thereof, for maintaining the amplitude of the generated A. C. voltage constant despite changes in the anode-cathode circuit of the amplifier and/or variations of the oscillation generator load impedance.

Another object of this invention is the provision of an improved voltage regulating apparatus to maintain the regulated voltage of an electrical load circuit constant notwithstanding a change in electrical load conditions and/or a drift of the unregulated source voltage.

Other objects of the invention will be pointed out in the following description and claims nad illustrated in the accompanying drawings, which disclose, by way of examples, the principle of the invention and the best mode, which has been contemplated, of applying that principle.

In the drawings:

Fig. 1 is a block diagram of an electrical dynamic weighing system for a toll highway recorder system.

Figs. 2a and 2b, taken together, constitute a wiring diagram of a voltage regulation apparatus adaptable for use in a dynamic weighing system.

*General description*

This invention is particularly adapted for, but not limited to, a dynamic weighing toll highway recorder system of the type shown and described in the afore-mentioned copending Cunningham et al. patent application. Although the preferred embodiment of this invention is directed to a voltage regulation apparatus for the dynamic weighing system of such a toll highway recorder system, it should be clear that the present invention may be applied to any electrical system where there is need for an accurate voltage regulation provided by apparatus defined in the appended claims.

Referring to Fig. 1, a very nearly constant amplitude, three kilocycle (kc.) output is generated by oscillator 780, and is applied as an excitation voltage to the strain gage bridge arrangement of load cells 782. As stated previously, load cells 782 support the weighing platform 24 so that whatever vehicle axle load is applied to the weighing platform is also directed to the load cells. As a result, a voltage which is related to the axle load applied to weighing platform 24, is directed to a very nearly constant gain carrier amplifier 783 and a phase sensitive demodulator 784. The D. C. output from demodulator 784 is also related to the axle load applied to weighing platform 24, and is directed to an axle weight storage element (not shown) within the weight storage unit 793. It might be well to mention here that the axle weight storage element in the afore-mentioned copending Cunningham et al. application, is a select one of a plurality of condensers for storing a D. C. output voltage from demodulator 784. A different select axle weight storage condenser is operatively connected to the output of demodulator 784 in response to each vehicle axle passing over weighing platform 24, so that a voltage related to only one axle weight is stored in each storage condenser.

A regulated power supply 786 is also used to provide a regulated D. C. load voltage. As shown in Fig. 1, this regulated load voltage is applied to amplifier 783 and oscillator 780 via line 641. In addition, this regulated D. C. load voltage is directed to a weight voltage compare circuit 787 for the purpose of determining vehicle classification. To explain this briefly, a more detailed description thereof being available in the copending Cunningham et al. application, the classification of a vehicle is based on the vehicle weight. In order to obtain a vehicle weight, since each axle load is represented by a voltage proportional thereto stored in a weigh storage element in unit 793, it is necessary to simply combine the voltages stored in a plurality of axle weight storage elements corresponding to the axles per vehicle. Thus, if the vehicle weight for a 3-axle vehicle is necessary, the voltages stored in the three axle weight storage elements corresponding to the three vehicle axle loads applied to weighing platform 24, are additively combined to afford a sum-total voltage indicative of the vehicle weight. This total vehicle weight-representing voltage is directed from the weight storage output 793b to weight voltage compare circuit 787. The vehicle weight-representing voltage is then compared in a step-by-step fashion with each of a plurality of voltage standards obtained from a voltage divider circuit connected to the regulated voltage load line of power supply 786. When this compare circuit 787 detects a predetermined relationship between the vehicle weight-representing voltage of weight storage output 793b and one of the plurality of voltage standards obtained from power supply 786, a classification indicating element in toll recorder 31 will be operated and the compare operation will be caused to stop. Thereafter, during a cyclic operation of the toll recorder, a vehicle classification value will be recorded on a trip card under control of the afore-mentioned operated vehicle classification indicating element.

It should be apparent at this time that the relationship between the oscillator 780 A. C. output and the power supply 786 D. C. output, should be constant. Should one or the other vary for some reason, the vehicle classifications determined thereafter would certainly be different from those determined prior to the change unless the ratio therebetween was maintained constant. For this reason, a voltage reference unit 788 is used to correlate the voltage outputs from oscillator 780 and power supply 786. In fact, the correlation is such that the ratio between the power supply load line D. C. voltage and the oscillator A. C. output voltage is a constant. Thus, should the amplitude of the oscillator output voltage decrease for some reason, the voltage regulator of power supply 786 will cause the load line output voltage thereof to decrease a proportional amount. As is shown in Fig. 1, a reference rectifier 781 directs a D. C. output voltage which is proportional to the oscillator A. C. voltage, to one side of the voltage reference unit 788. A portion of the regulated power supply voltage is directed to the other side of voltage reference unit 788. The function of this unit is to direct a control signal via line 642 to power supply 786 so that the output thereof is maintained proportional to the reference rectifier output voltage used as a reference value.

*Circuit description*

Referring to Fig. 2a, a vacuum tube amplifier V8, preferably a 6AQ5 type tube, is shown to have its plate connected to the commonly connected terminal of a 0.05 microfarad condenser 722 and a coil 642. The screen grid thereof is connected to the other end of the inductance coil 642 and condenser 722, and to the regulated D. C. voltage line 641 (see also Fig. 1). The control grid thereof is connected between a 560K ohm resistor 497 and a 0.001 microfarad condenser 643, whereas the suppressor grid is connected to the cathode thereof which, in turn, is connected to a 330 ohm resistor 498 and a 1.0 microfarad condenser 721. The values of the circuit components are such that with properly regulated feedback to be described shortly, a three kc. 100 volt A. C. output appears across coil 642. As a result thereof, an output of approximately 20 volts appears across secondary winding 644 so as to be applied across a bridge type resistor arrangement comprising a 15K ohm resistor 650, a 1.0K ohm potentiometer 651, a 1.8K ohm resistor 652, a 1.3K ohm resistor 746, and the resistors within the incandescent tungsten filament lamps identified by reference numeral 645. These lamp resistors are variable and have a positive temperature coefficient such that a resistance differential may be obtained by varying the temperature of the filaments within the lamps by changing the current flow therethrough. At a time when 20 volts is applied across coil 644, the combined resistance of the filaments within lamps 645 is approximately $\frac{1}{8}$ the value of the resistor 746, i. e., approximately $\frac{1}{8}$ of 1.3K ohms.

The movable arm of potentiometer 651 is connected to the control grid of amplifier V7, preferably a type 6136 vacuum tube. The anode of this tube is connected to a 470K ohm resistor 494 which, in turn, is connected to a 0.25 microfarad condenser 719, a 10K ohm resistor 493 and a 1.5 megohm resistor 495. The other end of resistor 493 is connected to the regulated power supply load line 641, and the other end of resistor 495 is connected between the screen grid of tube V7 and a 0.005 microfarad condenser 646. In addition thereto, the anode of tube V7 is connected to the other side of a 0.001 microfarad coupling condenser 643, whereas the suppressor grid is connected to the cathode which, in turn, is connected to ground via a 3.3K ohm resistor 496 and a 0.1 microfarad condenser 720.

*Reference rectifier 781.*—With a 100 volt output across coil 642, approximately 500 volts will be applied across coil 648. This 3 kc. oscillator output potential will be applied to the two plates of a full wave rectifier V16, preferably a type 6202 vacuum tube whose heater is run at constant current by means of a ballast tube (not shown). The direct current output therefrom is caused to pass through coil 649 which is connected to a one megohm resistor 654 and a 0.25 microfarad condenser 651. As a result, the voltage applied to the left grid of duo-triode V9, preferably a 5751 type vacuum tube, is approximately 80 volts.

*Power supply 786.*—Referring to Fig. 2b, an A. C. unregulated source voltage is applied to the plates of a rectifier V15, preferably a type 5690 vacuum tube, when line switch 752 is closed so as to connect the primary winding of transformer 753 to the A. C. power source 754. The unregulated D. C. rectified output from tube V15 is filtered by condenser 733, a choke 755 and another condenser 732 having a 180K ohm resistor 756 in parallel connection therewith. Normally the unregulated D. C. voltage applied to the line 420, is approximately +420 volts. Power supply regulating tubes V13 and V14, each preferably type 6216 vacuum tubes, are used as rheostats to cause the approximately +420 volts appearing on line 420 to be cut down to approximately +250 volts on line 641. The screen grids of each of the tubes V13 and V14 are connected to the afore-mentioned +420 volt line 420 whereas the suppressor grids thereof are each connected to their respective cathodes which, in turn, are connected to the regulated power supply D. C. load line 641. The control grids of tubes V13 and V14 are connected in parallel circuit to one end of a 470K ohm resistor 700, and to the plate of amplifier V12, preferably one-half of a type 5965 duo-triode vacuum tube. The other end of resistor 700 is connected to a 5.6 megohm resistor 701 and the resistor 756, whereas the other end of resistor 701 is connected via line 760 to the two commonly connected cathodes of vacuum tube V9 (see also Fig. 2a).

The cathode of amplifier V12 (Fig. 2b) is connected to the regulated power supply load line 641 through a 22K ohm resistor 668. This cathode is also connected to ground through a 39K ohm resistor 669 and a 0.01 microfarad condenser 731, whereas the control grid thereof is connected to the left plate of duo-triode V9 (Fig. 2a) via line 758.

*Voltage reference unit 788.*—The plate of the left triode amplifier of tube V9 is also connected to the regulated power supply load line 641 through a 470K ohm resistor 655 and a 220 micro-microfarad condenser 724. The plate of the right "control device" triode of this tube is connected to line 641 through a 470K ohm resistor 656. It would be well to point out here that since the right triode of tube V9 governs, in part, the operation of the left amplifier triode of tube V9, the said right triode may properly be termed a control device. The left grid of tube V9 is connected to the lower end of resistor 654 and to the connected ends of a 500K ohm resistor 653 and a 0.25 microfarad condenser 726. The right grid of tube V9 is connected to one end of a 0.01 microfarad condenser 725 and the manually movable arm of a 5K ohm potentiometer 658. The 50K ohm resistor 657 and the 20K ohm resistor 659 are connected in series circuit with the impedance 658, all of which are connected in shunt with the electrical load applied to the regulated power supply load line 641. The potentiometer 658 is set manually to provide approximately 80 volts to the right grid of tube V9, i. e., the same voltage as is applied to the left grid thereof. As is shown, the cathodes of tube V9 are electrically common and are connected to line 760, as mentioned previously, as well as to the 220K ohm grounded resistor 660.

*Load cells 782.*—Referring once again to Fig. 2a, the load cell strain gage bridge arrangements 632a and 632b have a 3 kc. excitation voltage applied thereto from the oscillation generator via secondary coils 661 and 662. These bridge arrangements are shown to be connected in series circuit between the primary winding of a transformer 663 and ground. Since the load cells per se are not a part of this invention, and in view of the fact that there is much readily available material concerning load cells, they will not be described in detail herein. It is desirable to state at this time that the load cells used in the preferred embodiment of this invention, are designed to provide a 2 millivolt output for every A. C. excitation volt input when a 20,000 pound load is applied to the weighing platform 24 (see also Fig. 1) which the load cells support. The potential normally appearing across coils 661 and 662 at zero load, is 5.8 volts. Thus, a 20,000 pound load applied to the weighing platform will cause an 11.6 millivolt load cell output. This A. C. output is directed through transformer 663 to the control grid of amplifier V10 (Fig. 2b), preferably a type 6136 tube.

*Carrier amplifier 783.*—Vacuum tube V10 has its plate connected to a 560K ohm resistor 761 and a 0.01 microfarad condenser 764. The screen grid thereof is connected to a 1.2 megohm resistor 762 and a .25 microfarad condenser 727. The cathode of tube V10 is connected to the suppressor grid, the other end of condenser 727, a 33K ohm resistor 664, and a 250 ohm resistor 665. The control grid of amplifier V11, preferably one-half of a type 5965 vacuum tube, is connected to one end of a 2.2 megohm resistor 763, whereas the plate thereof is connected to one end of a 1.0 microfarad condenser 728, the other end of which is connected to resistor 664. The cathode of tube V11 is connected to ground through a 1K ohm resistor 667 and a 1.0 microfarad condenser 729.

The 3 kc. load cell output signal is applied to the control grid of vacuum tube V10 by way of the transformer 663 shown in Fig. 2a, whereby the signal is inverted and then directed to the control grid of tube V11 (Fig. 2b) where, once again the signal is amplified and inverted. The output of tube V11 is directed to the parallel circuit primary windings of transformer 765, the other end of each of which is connected to the power supply D. C. voltage line 641. A feedback is provided from tube V11 to tube V10 via the circuit including condenser 728, and resistors 664 and 665. Resistor 664 is a specially wound temperature compensating resistor comprised of two different temperature coefficient metals. This has been done so that the amplification of the carrier amplifier comprising tubes V10 and V11 is a constant regardless of the temperature of the elements comprising the amplifier. Thus, should the temperature of the amplifier increase, for example, the over-all gain of the carrier amplifier, if resistor 664 were made of most ordinary materials, would normally tend to change. This change in gain is prevented by the temperature compensating resistor 664 which has characteristics such that an amplifier temperature increase, for example, will increase the resistance thereof in predetermined amounts so that the degenerative effect of the feedback will be lessened as the temperature is increased, and the gain of the amplifier maintained constant.

*Phase sensitive demodulator 784.*—The output from amplifier tube V11 is directed through transformer 765 to the demodulator tubes V17 through V20, each preferably type 5726 duo-diodes. The arrangmeent is such that when the voltage across the reference rectifier input coil 648 (see also Fig. 2a) is of one polarity, tubes V19 and V20 will conduct, whereas when the potential across coils 648 is of the opposite polarity, vacuum tubes V17 and V18 will conduct. If it is assumed, for example, that an instantaneous voltage applied along line 776 (Fig. 2b) is positive, a positive potential will then be applied to the left plates of tubes V19 and V20 so that the left diodes thereof will conduct. In view of the fact that the voltage drop within the tube is negligible, the cathodes thereof will be raised to the potential of their respective plates. Since the cathode of the left diode of tube V19 is connected to the anode of the right diode of tube V20, the right diode of tube V20 will also be caused to conduct. In a similar fashion, the right diode of tube V19 will be caused to conduct.

If the axle weight-representing A. C. output from amplifier tube V11 is in phase with the oscillator output signal applied to lines 776 and 767 via coil 648 (see also Fig. 2a), a D. C. signal voltage which corresponds in magnitude to the axle weight applied to weighing platform 24 (see also Fig. 1) will be developed across the 500K ohm resistor 863. To clarify this point, if both diodes in each of the tubes V19 and V20 are conducting, and if at this time the polarity of the signal applied to lines 864 and 865 is in phase with the signal applied to lines 776 and 767, a voltage drop will develop across resistor 863. This voltage will actually be the demodulated signal which forms the envelope of the carrier frequency as generated by the oscillator, as a result of the axle passing over the weighing platform. When line 865 goes positive in phase with the conduction of tubes V17 and V18, a voltage having the same polarity as before will appear across resistor 863. It is this voltage which is applied via line 424 to the axle weight storage condensers in weight storage unit 793 (Fig. 1).

*Operation and summary*

Should, for example, an increased load be applied to the oscillation generator 780 (Fig. 1) so that the A. C. output voltage thereof across coil 642 (Fig. 2a) has a tendency to decrease, this will be reflected by a decrease of the voltage across coil 644. As a result, the current flow through lamps 645 will decrease, and the resistance thereof will also decrease. Thus, the A. C. voltage difference between the bridge output line 647 and ground will change so as to increase the amplitude of the A. C. output thereof, and accordingly the output of tube V7. This will cause a larger amplitude signal to be applied to the control grid of vacuum tube V8 so as to cause a corresponding change in the output thereof which will appear to counteract the initial voltage decrease of the oscillator. Accordingly, the oscillator output will remain very nearly constant. It is to be observed that no current other than a portion of the oscillator A. C. output current flows through lamps 645. Thus, the resistance of the lamps will be caused to change only by a change in the oscillator A. C. output. That is, a change in the cathode-anode D. C. current through tubes V7 and/or V8, will not affect the current flow through the aforesaid lamps. Another advantage in the present oscillator generator arrangement resides in the ability to use precision resistors in three arms of the bridge. The non-linear resistance represented by lamps 645 is a self-regulating resistor. Thus, a change in temperature and other conditions, such as resulting from age for example, will not affect the regulating action of the oscillator.

In the event that the regulated power supply load line D. C. voltage applied to line 641 should tend to decrease for some reason, such as a malfunction of the regulating tubes V13 and V14 (Fig. 2b), for example, the voltage applied to the right grid of tube V9 (see also Fig. 2a), i. e., the voltage obtained from potentiometer 658, will also tend to decrease a proportional amount. As a result, the cathode potential of tube V9 will decrease a like amount. Inasmuch as the voltage applied to the left grid, e. g., approximately 80 volts, is dependent upon the D. C. output from the reference rectifier tube V16 which, in turn, is dependent upon the A. C. amplitude output from the oscillation generator 780 (Fig. 1), a decrease of the potential applied to the right cathode of tube V9 (Fig. 2a) will be reflected as an increase in the potential applied to the left grid of tube V9. This, of course, will tend to make the left triode portion of tube V9 conduct more readily, whereby the voltage applied to line 758 will tend to decrease. This decrease will be reflected as an increase at the control grids of regulating tubes V13 (Fig. 2b) and V14 due to inverter amplifier V12. Since, as will be recalled, the regulating tubes V13 and V14 simply act as rheostats, the cathode potential of the respective regulating tubes V13 and V14 will be brought nearer to the plate potential by an increased grid signal. The fact of the matter is that the cathode potential will be changed an amount such that the power supply output volage along load line 641 will remain at a nearly constant level dependent, of course, upon the magnitude of the reference rectifier voltage applied to the left grid of tube V9.

In the event that the voltage along load line 641 should tend to increase, a similar action will take place so as to apply a more negative potential to the control grids of regulating tubes V13 and V14, whereby the voltage along line 641 will be brought down to the level determined by the reference rectifier output so that the oscillator and power supply voltage outputs will remain at a predetermined ratio. As will be explained in detail hereinafter, it must be remembered that in the event the reference rectifier voltage output applied to the left grid of vacuum tube V9 should change, the D. C. voltage along load line 641 will change a proportional amount. This is for the reason that the potential along power supply load line 641 is applied to the right grid of vacuum tube V9, and is, in effect, compared with the rectified output of the oscillator generator which is applied to the left grid of the same tube.

The power supply voltage regulator thus far described for maintaining the voltage applied to the load line 641 constant, is well known in the art. This type of voltage regulator is not adequate, however, to maintain the load line voltage constant should the unregulated source voltage vary along line 420, for example. The present invention is an improvement over the prior art in this respect for the reason that apparatus has been provided to maintain the power supply load voltage constant along line 641 whether the regulated load voltage tends to vary or whether the unregulated source voltage tends to vary.

If, for example, the rectifier tube V15 voltage output should change, the load line voltage along line 641 would tend to change in the same direction. The regulator system just described hereinabove would not in such a case provide a sufficient corrective factor to maintain the voltage on line 641 constant, or very nearly so, and, in fact, proportional to the reference rectifier voltage applied to the left grid of tube V9 (Fig. 2a). The voltage control is obtained, however, by way of the connection including resistor 701 which is interposed between the filtered rectifier output along line 420 and the common cathodes of vacuum tube V9. Thus, for example, if the +420 volts which is normally applied to the plates of regulating tubes V13 and V14 should decrease, the voltage appearing at the cathodes of vacuum tube V9 would also decrease due to the drop across the 5.6 megohm resistor 701. In addition, the voltage at the common cathodes of tube V9 would also be decreased as a result of the drop in potential applied to the right grid of tube V9, this drop being reflected by the potentiometer 658 as a result of a drop in voltage along load line 641, as previously described. The decrease of the cathode potential as a result of the decrease in current conduction through the right triode of tube V9 as well as the decreased current flow through resistors 701 and 660 (see also Fig. 2a), is reflected as a more positive grid to cathode voltage on the left triode of tube V9. This, as before, will tend to make the control grids of regulating tubes V13 and V14 more positive, to once again raise the potential along line 641 to the desired level.

If for some reason, such as the value of resistor 746 (Fig. 2a) changing for example, the amplitude of the oscillator output should change, this will be reflected as a corresponding D. C. voltage change at the left grid of tube V9. Thus, should the amplitude of the oscillator output decrease, the voltage applied to the left grid of tube V9 will be more negative than before, so that the input signal to amplifier V12 (Fig. 2b) will be more positive. In turn, the signals applied to the control grids of regulating tubes V13 and V14 will be more negative than previously, whereby the regulated power supply load line voltage on line 641 will be decreased. The circuit component values are such that the ratio of the regulated power supply load voltage on line 641 with respect to the reference rectifier D. C. potential applied to the left grid of tube V9, will remain the same. In other words, the power supply load line D. C. voltage will remain proportional to the oscillator A. C. output amplitude. On the other hand, should the oscillator output amplitude increase, the signal applied to the left grid of tube V9 will be more positive, whereupon the signal applied to the control grids of tubes V13 and V14 will be more positive. As a result, the voltage along load line 641 will increase an amount so that once again the ratio between the voltage on line 641 and that applied to the left grid of tube V9 will remain the same.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic system for regulating the voltage of a load circuit, the combination of a source of unregulated voltage, a regulating device provided with a control grid circuit and with a cathode-anode circuit serially connected with and interposed between said load circuit and one side of said unregulated voltage source, an impedance device connected in shunt to said load circuit, an amplifier provided with a cathode-anode output circuit and with an input circuit, means including an impedance connected in the output circuit in said amplifier for regulating the control grid circuit potential of said regulating device, a control device provided with an input circuit and with a cathode connected to the cathode of said amplifier, means for applying the potential drop across said impedance device to said control device input circuit, means including a first resistor for connecting the commonly connected cathodes of said amplifier and said control device to said one side of said unregulated voltage source, and means including a second resistor for connecting the commonly connected cathodes to the other side of said unregulated voltage source so as to be responsive to the cathode-anode current of said control device and to the current through said first resistor, to thereby control the cathode-anode circuit of said amplifier.

2. An electronic system for regulating the D. C. voltage of a load circuit comprising a source of unregulated D. C. voltage; an A. C. oscillation generator; an electron discharge voltage regulating device provided with a control grid circuit and with a cathode-anode circuit connected in series circuit between said load circuit and one side of said unregulated voltage source; a manually operable potentiometer connected in shunt to said load circuit; a first amplifier provided with a cathode-anode circuit and with an input circuit; means including a second amplifier and a first resistor connected in the cathode-anode circuit of said first amplifier for regulating the control grid circuit potential of said regulating device according to the first amplifier cathode-anode current flow; an electron discharge control device provided with an input circuit and with a cathode connected to the cathode of said first amplifier; means for applying the potential drop across said manually operable potentiometer to said control device input circuit; means including a second resistor for connecting the commonly connected cathodes of said first amplifier and said control device to one side of said unregulated voltage source; means including a reference rectifier connected to the output of said oscillation generator for applying a D. C. biasing potential corresponding to the amplitude of the oscillation generator A. C. signal to said first amplifier input circuit; and means to control the cathode-anode circuit of said first amplifier and thereby the cathode-anode circuit of said voltage regulating device, including a third resistor for connecting the commonly connected cathodes to the other side of said unregulated voltage source so as to be responsive to the cathode-anode current of said control device and to the current through said second resistor, whereby the voltage of said load circuit is automatically regulated with respect to the unregulated source voltage and maintained at a fixed ratio relative the voltage of said oscillation generator, said fixed voltage ratio being determined by the manual setting of said manually operable potentiometer.

3. An electronic system according to claim 2 wherein said A. C. oscillation generator comprises a third amplifier having a cathode-anode output circuit and a grid input circuit, a resistive bridge-type circuit having a positive temperature coefficient resistor in at least one arm thereof, and means including (a) a transformer for connecting the input of said bridge circuit to said first amplifier cathode-anode output circuit and (b) a fourth amplifier for connecting the bridge circuit output to said first amplifier grid circuit, said means including a reference rectifier being conductively coupled to said transformer.

References Cited in the file of this patent

UNITED STATES PATENTS

| | | |
|---|---|---|
| 2,210,393 | Braden | Aug. 6, 1940 |
| 2,752,555 | Light | June 26, 1956 |